3,770,701
HETERIC NONIONIC SURFACTANTS HAVING
ENHANCED DETERGENCY
Moses Cenker, Trenton, and Eugene A. Weipert, Allen Park, Mich., assignors to BASF Wyandotte Corporation, Wyandotte, Mich.
No Drawing. Filed July 8, 1965, Ser. No. 470,622
Int. Cl. C07c 43/00, 43/04
U.S. Cl. 260—65 B                    6 Claims

ABSTRACT OF THE DISCLOSURE

This invention relates to liquid, biodegradable, water-miscible, nonionic surfactants. More particularly, this invention relates to liquid, biodegradable, water-miscible, nonionic surfactants having unexpectedly high detergency prepared from straight chain aliphatic alcohols having from 8 to 22 carbon atoms in the aliphatic chain and a mixture of ethylene oxide and propylene oxide.

---

It has been desired to prepare liquid, biodegradable, water-miscible, nonionic surfactants based on ethylene oxide condensates of straight chain aliphatic alcohols having 8 to 22 carbon atoms in the aliphatic chain. For a number of reasons, previous attempts to do so have failed. With few exceptions, the products prepared from these condensates are solids or pastes and, accordingly, difficult to handle in commercial applications. In those instances where liquid products are obtained, the products are not water-miscible nor do they possess good detergency.

It is known in the art that propylene oxide adducts of alcohols and alcohol condensates tend to be liquids. However, it is also known that the addition of propylene oxide to alcohols or alcohol condensates results in products which are not generally water-miscible and which have reduced detergency.

Now, in accordance with this invention, liquid, biodegradable, water-miscible, nonionic surfactants having surprisingly superior detergency are prepared from straight chain aliphatic alcohols, ethylene oxide and propylene oxide. These surfactants are prepared by the reaction of a straight chain aliphatic alcohol having from 8 to 22 carbon atoms, preferably from 12 to 18 carbon atoms, in the aliphatic chain with a mixture of ethylene oxide and propylene oxide in a weight ratio of ethylene oxide to propylene oxide of from 1.3:1 to 6.8:1. The surfactants of this invention comprise the composition obtained by reacting, on a weight basis, 45% to 68% ethylene oxide, 10% to 35% propylene oxide and 20% to 33% alcohol. They may be represented by the following formula:

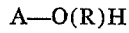

wherein A is a straight chain alkyl group having from 8 to 22 carbon atoms and R is a mixture of oxyethylene and oxypropylene groups, said mixture being from 67% to 80% of the total weight of the surfactant, the weight ratio of oxyethylene to oxypropylene groups in said mixture being in the range of from 1.3:1 to 6.8:1. The A—O in the foregoing formula may also be defined as the residue of the alcohol employed in the condensation reaction, i.e., the alcohol with the hydrogen in the OH radical removed. It is to be understood that if a mixture of alcohols is employed in the condensation reaction, the product obtained will be a mixture of compounds having the foregoing formula, the compounds differing from each other in the number of carbon atoms in the alkyl group. It has been discovered that only by employing critical amounts of alcohol, ethylene oxide and propylene oxide can products be prepared which are liquid, biodegradable and water-miscible, an which possess enhanced detergency.

Alcohols which may be employed in the preparation of the surfactants of this invention are those straight chain aliphatic alcohols which contain from 8 to 22 carbon atoms in the aliphatic chain. Mixtures of the alcohols may also be used and, in fact, are preferred since their use provides for a good balance of properties in the resulting surfactants. Branched chain aliphatic alcohols are not operable in this invention, nor are aliphatic alcohols containing less than eight carbon atoms in the aliphatic chain since these alcohols do not impart biodegradability to the resulting products, nor do the products resulting from their use, along with the stated amounts of oxides, possess good detergency. Examples of alcohols which are operable include octyl alcohol, nonyl alcohol, decyl alcohol, dodecyl alcohol, tetradecyl alcohol, cetyl alcohol, lauryl alcohol, palmityl alcohol, stearyl alcohol, hydrogenated tallow alcohol, and mixtures thereof. It is possible to employ small amounts of branched chain alcohols along with the above-mentioned straight chain alcohols as long as the amount used does not impair the biodegradability of the resulting product. An example of such an alcohol mixture is commercially available from Shell Oil Company under the name Shell Detergent Alcohol (a mixture of $C_{12}$–$C_{15}$ alcohols).

The products of this invention are prepared by condensing an alcohol or mixture of alcohols, as described above, with a mixture of ethylene oxide and propylene oxide. The oxide mixture may be added to the alcohol in one continuous step or it may be added in several steps. If the oxide mixture is added in several steps, it is not necessary that the amount of ethylene oxide and propylene oxide added in each step be within the required weight and ratio ranges. It is only necessary that the total amount of ethylene oxide and propylene oxide added constitute 67 to 80 weight percent of the surfactant product and that the ratio of the total amount of ethylene oxide to the total amount of propylene oxide be in the range of 1.3:1 to 6.8:1. Thus, it is possible to add a first amount of oxide mixture which has more propylene oxide than ethylene oxide as long as subsequent amounts of oxide mixture added bring the total amount of oxides added within the required ranges. It is also possible to add a first amount containing only propylene oxide and then to add additional amounts of oxide mixtures. Again, the only requirement is that the total amount of oxides added be within the required critical ranges.

In a preferred embodiment of this invention, the oxides are added in two distinct steps, the first step containing either all propylene oxide or more propylene oxide than ethylene oxide. This enables the preparation of nonionic surfactants which have more oxypropylene groups randomly distributed proximate to the alcoholic hydrophobic portion of the surfactant. Adding the oxides in steps provides for the preparation of liquid surfactants containing relatively small amounts of ethylene oxide (about 45%) yet still possessing exceptional detergency and surprising water solubility. Heretofore, surfactants based on hydrophobic alcohols and ethylene oxide have generally required that at least 55% of the total product be ethylene oxide if the product is to be water-miscible. Surfactants prepared by adding oxide to the alcohol in steps may be represented by the formula:

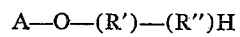

wherein A is a straight chain alkyl group having from 8 to 22 carbon atoms, R' is selected from the group consisting of oxypropylene groups and a mixture of oxyethylene and oxypropylene groups, the weight ratio of oxyethylene to oxypropylene in said mixture being a number less than 1.0, R" is a mixture of oxyethylene and oxypropylene groups, the weight ratio of oxyethylene to oxypropylene being such that the total weight ratio of oxyethylene to oxypropylene in R' and R" is from 1.3:1 to 6.8:1, the total weight of the surfactant being from 67% to 80% oxyethylene and oxypropylene groups. The A—O in the foregoing formula may also be defined as the residue of the alcohol employed in the condensation reaction, i.e., the alcohol with the hydrogen in the OH radical removed.

The products of this invention have a heteric structure. By this is meant that the products possess random distribution of oxyethylene and oxypropylene groups. As mentioned above, the amount of oxides used is very important. In order to obtain the products of this invention, it is important that the oxides be employed in a weight ratio of ethylene oxide to propylene oxide of from 1.3:1 to 6.8:1, preferably 1.5:1 to 4:1. Not only is it important that the ratio of ethylene oxide to propylene oxide be maintained within the above-stated range, but also it is important that the total amount of oxides employed be such that the product contain from 67% to 80% by weight of oxyethylene and oxypropylene groups.

The products of this invention are generally prepared by condensing the alcohol with a mixture of ethylene oxide and propylene oxide in the presence of an alkaline catalyst. Catalysts which may be employed include sodium hydroxide, potassium hydroxide, sodium ethylate, sodium methylate, potassium acetate, sodium acetate and trimethylamine. Any other types of catalysts commonly used for alkylene oxide condensation reactions may also be employed.

After the condensation reaction is completed, the catalyst is removed from the reaction mixture by any known procedure such as neutralization and filtration, or ion exchange. The condensation is preferably carried out at elevated temperatures and pressures.

The following examples illustrate the invention. All parts are by weight unless otherwise stated.

of ethylene oxide and propylene oxide was added over a period of from three to five hours at from 30 to 70 p.s.i.g. The products were stirred for an additional hour at about 150° C., cooled to about 50° C. and discharged from the reactor.

The catalyst was neutralized with glacial acetic acid and volatiles were removed by stripping at 100° C. and at ten millimeters of mercury for one hour. Product recovery was greater than 95% in each case.

The products prepared are characterized in Table 1. Detergency values were obtained using the tagged clay soil removal method. This method is described in "Applied Radiation and Isotope Test Methods," ASTM STP No. 260, pages 27-39, 1959. Biodegradability was determined by the shake flask culture technique. This involves first preparing a basal medium of distilled water, yeast extract, ammonium chloride, potassium hydrogen phosphate, magnesium sulfate septahydrate, potassium chloride and ferrous sulfate and then adding a candidate surfactant (in the form of a solution) to the basal medium to give a surfactant concentration of 30 p.p.m. A microbial culture is prepared based on unchlorinated final effluent from an activated sludge sewage disposal plant. The basal medium containing the candidate surfactant is then inoculated with the microbial culture and placed in a shaking machine for aeration. To follow the course of biodegradation, aliquots are removed for analysis (potassium iodobismuthate method, J. Anal. Chem., Bruger, K., 196, 251 (1963)) immediately after inoculation and at 24-hour intervals thereafter for a period of seven days. The analysis indicates the amount of surfactant remaining in parts per million. Although there is uncertainty in the art as to that which is biodegradable and that which is not sufficiently biodegradable, for the purpose of this application a surfactant which degrades 85% within seven days is considered biodegradable.

TABLE 1

| Example | Alcohol, parts | EO,[1] parts | PO,[2] parts | EO[1] plus PO,[2] parts | EO[1]/PO[2] | Products[3] | TCSR[4] Det. | TCSR[4] WR | TCSR[3] plus 2% CMC[5] Det. | TCSR[3] plus 2% CMC[5] WR |
|---|---|---|---|---|---|---|---|---|---|---|
| Ia | A | 37.5 | 62.5 | 0 | 62.5 | — | Solid | 130 | 25 | 135 | 120 |
| Ib | A | 35 | 60 | 5 | 65 | 12:1 | Paste | Not run | | | |
| Ic | A | 20 | 70 | 10 | 80 | 7:1 | ....do.... | Not run | | | |
| II | A | 22 | 68 | 10 | 78 | 6.8:1 | Liquid-bio. | 141 | 56 | 143 | 150 |
| III | A | 30 | 60 | 10 | 70 | 6:1 | Liquid-bio. (90%) | 139 | 27 | 147 | 127 |
| IV | A | 25 | 60 | 15 | 75 | 4:1 | Liquid-bio. (95%) | 140 | 55 | 142 | 156 |
| V | A | 20 | 62.5 | 17.5 | 80 | 3.58:1 | Liquid-bio. (90%) | 149 | 89 | 151 | 182 |
| VI | A | 20 | 60 | 20 | 80 | 3:1 | Liquid-bio. (95%) | 147 | 90 | 152 | 181 |
| VII | A | 16 | 63 | 21 | 84 | 3:1 | Liquid-NSB (<60%) | 147 | 86 | 150 | 195 |
| VIII | A | 16.67 | 60 | 23.33 | 83.33 | 2.58:1 | ....do.... | 147 | 86 | 150 | 195 |
| IX | A | 14 | 60 | 26 | 86 | 2.31:1 | ....do.... | 141 | 28 | 149 | 121 |
| X | A | 20 | 55 | 25 | 80 | 2.2:1 | Liquid-bio. (90%) | 143 | 58 | 145 | 161 |
| XI | A | 20 | 52 | 28 | 80 | 1.86:1 | Liquid-bio. (95%) | 140 | 29 | 146 | 111 |
| XII | A | 25 | 41 | 34 | 75 | 1.2:1 | Liquid-NSB; W.I. | Not run | | | |
| XIII | B | 37.5 | 62.5 | 0 | 62.5 | — | Solid | 112 | 20 | 116 | 110 |
| XIV | B | 16 | 71.0 | 13 | 84 | 5.46:1 | Liquid-NSB (<60%) | 136 | 60 | 140 | 139 |
| XV | B | 20 | 68.0 | 12 | 80 | 5.68:1 | Liquid-bio. (95%) | 137 | 86 | 141 | 151 |
| XVI | B | 20 | 60 | 20 | 80 | 3:1 | ....do.... | 142 | 52 | 147 | 156 |
| XVII | C | 20 | 60 | 20 | 80 | 3:1 | ....do.... | 145 | 94 | 149 | 200 |
| XVIII | D | 46.67 | 40 | 13.33 | 53.33 | 3:1 | Paste; W.I. | Not run | | | |
| XIX | D | 20 | 60 | 20 | 80 | 3:1 | Liquid-bio. (90%) | 137 | 46 | 151 | 170 |
| XX | E | 20 | 60 | 20 | 80 | 3:1 | ....do.... | 144 | 104 | 145 | 189 |

[1] Ethylene oxide.
[2] Propylene oxide.
[3] All characterizations made at room temperature.
[4] Tagged clay soil removal.
[5] Sodium carboxymethylcellulose.

Notes:
A = A mixture containing approximately 40% $C_{12}$ alcohol, 30% $C_{14}$ alcohol, 20% $C_{16}$ alcohol and 10% $C_{18}$ alcohol.
B = A mixture containing approximately 70% $C_{10}$ alcohol and 30% $C_{12}$ alcohol.
C = A mixture containing approximately 13% $C_{12}$ alcohol, 6% $C_{14}$ alcohol, 23% $C_{16}$ alcohol and 55% $C_{18}$ alcohol.
D = Hydrogenated tallow alcohol (a mixture containing approximately 32% $C_{16}$ alcohol and 68% $C_{18}$ alcohol.
E = A mixture containing approximately 12% $C_{12}$ alcohol, 10% $C_{14}$ alcohol, 50% $C_{16}$ alcohol, 24% $C_{18}$ alcohol and 4% $C_{20}$ alcohol.
Bio. = Biodegradable.
NSB = Not sufficiently biodegradable.
W.I. = Water immiscible.

EXAMPLES I–XX

Several surfactants were prepared in the following manner. Details as to the preparations are found in Table 1.

A clean, dry reactor was purged with nitrogen and charged with a straight chain aliphatic alcohol and a potassium hydroxide catalyst. In each instance, the mixture was stirred at from 150° C. to 175° C. while a mixture Examples I–XX demonstrate how the reactants may be varied to obtain the products of this invention. As is clear from the examples, it is important that critical amounts of ethylene oxide, propylene oxide and total oxide be employed. The examples clearly illustrate that it is not only important that the ethylene oxide to propylene oxide ratio be maintained in the range of 1.3:1 to 6.8:1 but it is also important that the total amount of oxide be between 67% and 80% of the product. In Examples II–VI, X–XI, XV–XVII, XIX and XX, products were prepared which are within the scope of this invention. In Examples I, VII–IX, XII–XIV and XVIII, products were prepared which are outside the scope of this invention. The products of Example I were prepared using an ethylene oxide-propylene oxide ratio of greater than 6.8:1 whereas the product of Example XII was prepared using an ethylene oxide-propylene oxide of less than 1.3:1. The products of Examples VII–IX, XIV and XVIII were prepared using an ethylene oxide to propylene oxide ratio within that of this invention but using amounts of oxide so as to obtain a product containing more than 80% by weight of oxyethylene and oxypropylene groups. These latter products did not possess the superior properties of the products of this invention. Some were not liquids, others not water-miscible, and still other not sufficiently biodegradable.

EXAMPLE XXI

A clean, dry reactor was purged with nitrogen and charged with 5.55 parts of an alcohol mixture (the same mixture labeled A in Table 1) and 0.02 parts of potassium hydroxide. The charge was heated to about 125° C. and a mixture of 1.66 parts of ethylene oxide and 3.88 parts of propylene oxide was added over a period of two hours at 125° to 130° C., maintaining the pressure below 90 p.s.ig. Upon completion of the oxide addition, the reaction mixture was stirred for an additional hour and then heated to 150° C. While maintaining the temperature between 150° C. and 155° C., 11.63 parts of ethylene oxide and 4.99 parts of propylene oxide were added over a period of three and one-half hours, again maintaining the pressure below 90 p.s.i.g. The total amount of oxide employed was 22.6 parts (80% of the product). The ethylene oxide to propylene oxide ratio was 1.5:1. The reaction mixture was stirred for an additional hour at 150° C. before cooling to 75° C., at which temperature the catalyst was neutralized with glacial acetic acid. Volatiles were removed from the finished product by stripping at 10 millimeters of mercury and at 125° C. for about one hour.

A pale yellow liquid was obtained with a hydroxyl number of about 55 and having a cloud point of 58° C. The product was miscible with water and biodegradable (85% using the test described above). Detergency values were obtained using the tagged clay soil removal test noted above and the UST fabric test described in Detergency Evaluation & Testing, Harris, J. C., Interscience Publishers, Inc., New York, 1954, pp. 87–8. Values obtained were:

TCSR plus 1% carboxymethylcellulose:
    Detergency _____ 142
    Whiteness retention (WR) _____ 78
    UST fabric _____ 20.0

EXAMPLE XXII

A surfactant was prepared following the general procedure described in Example XXI with the single exception that a first amount containing only propylene oxide was added to the alcohol mixture. The amounts used were as follows:

20 parts of alcohol mixture (same mixture labeled A in Table 1)
10.8 parts of propylene oxide (Step one)
24.2 parts of propylene oxide (Step Two
45 parts of ethylene oxide (Step two)

The total amount of oxide employed was 80 parts (80% of the product). The total ethylene oxide to propylene oxide ratio was 1.29:1.

A pale yellow liquid was obtained which was miscible with water and biodegradable (85% using the test described above). Detergency values obtained were as follows:

TCSR plus 1% carboxymethylcellulose:
    Detergency _____ 146
    Whiteness retention (WR) _____ 70
    UST fabric _____ 20.6

What is claimed is:

1. A liquid, biodegradable, water-miscible, nonionic surfactant or mixture of surfactants of the formula:

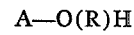

A—O(R)H wherein A is a straight chain alkyl group having from 8 to 22 carbon atoms and R is a random mixture of oxyethylene and oxypropylene groups, said mixture being from 67% to 80% of the total weight of the surfactant, the weight ratio of oxyethylene to oxypropylene groups in said mixture being in the range of from 1.3:1 to 6.8:1.

2. The surfactants of claim 1 when A is a straight chain alkyl group having from 12 to 18 carbon atoms.

3. The surfactants of claim 1 when the weight ratio of oxyethylene to oxypropylene groups is in the range of 1.5:1 to 4:1.

4. A liquid, biodegradable, water-miscible, nonionic surfactant or mixture of surfactants of the formula:

A—O—(R')—(R'')H wherein A is a straight chain alkyl group having from 8 to 22 carbon atoms, R' is selected from the group consisting of oxypropylene groups and a random mixture of oxyethylene and oxypropylene groups, the weight ratio of oxyethylene to oxypropylene in said mixture being a number less than 1.0, R'' is a random mixture of oxyethylene and oxypropylene groups, the weight ratio of oxyethylene to oxypropylene being such that the total weight ratio of oxyethylene to oxypropylene in R' and R'' is from 1.3:1 to 6.8:1, the total weight of the surfactant being from 67% to 80% oxyethylene and oxypropylene groups.

5. The surfactants of claim 4 when A is a straight chain alkyl group having from 12 to 18 carbons atoms.

6. A liquid composition comprising a mixture of polyoxyalkylene compounds each having a heteric polyoxyalkylene chain of randomly distributed oxyethylene and oxypropylene groups attached to the residue of a straight chain primary alkanol at the site of its reactive hydrogen atom, said chain having 13 to 21 oxyalkylene groups, the mole ratio of said oxyethylene to said oxypropylene groups being 1.71:1 to 8.95:1, said alcohol having 8–22 carbon atoms per molecule.

References Cited

UNITED STATES PATENTS 3,340,309    9/1967    Weipert _____ 260—615 B
3,382,285    5/1968    Egan et al. _____ 260—615 B HOWARD T. MARS, Primary Examiner U.S. Cl. X.R.

252—89, 351